F. L. HAWKINS.
NOODLE CUTTER.
APPLICATION FILED JUNE 26, 1909.
958,809.
Patented May 24, 1910.
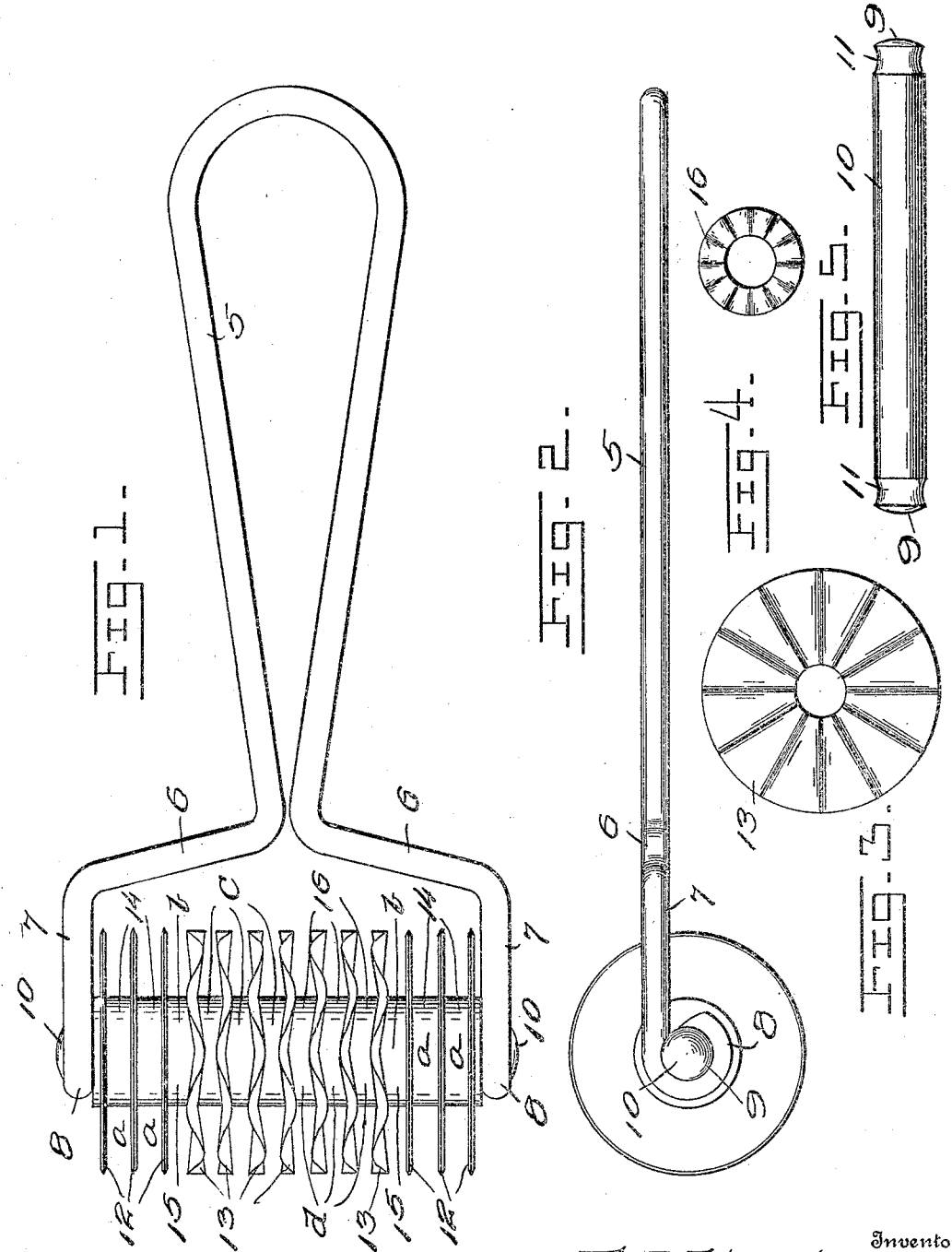
Witnesses
Inventor
F. L. Hawkins
By Woodward & Chandlee
Attorneys

UNITED STATES PATENT OFFICE.

FREDRICK L. HAWKINS, OF MISHAWAKA, INDIANA.

NOODLE-CUTTER.

958,809.  Specification of Letters Patent.  Patented May 24, 1910.

Application filed June 26, 1909. Serial No. 504,537.

*To all whom it may concern:*

Be it known that I, FREDRICK L. HAWKINS, a citizen of the United States, residing at Mishawaka, in the county of St. Joseph and State of Indiana, have invented certain new and useful Improvements in Noodle-Cutters, of which the following is a specification.

The primary object of my invention is, to provide a noodle cutter of simple construction, arranged so that the strips, will have an ornamental shape, to destroy the usual vermiform appearance of the noodles.

Another object of my invention is, to provide a noodle cutter, by means of which a parallel series of noodle strips may be cut in one operation, the strips having an ornamental configuration, and being of several kinds.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawing forming a part of this specification, and in which like characters of reference indicate similar parts in the several views, Figure 1 is a top view of the noodle cutter embodying my invention. Fig. 2 is a side view thereof. Fig. 3 is a face view of one of the corrugated circular cutters. Fig. 4 shows a face view of one of the corrugated washers. Fig. 5 is a detached detail of the supporting shaft.

In the preparation of noodles, it is highly desirable to rob the prepared dish of its vermiform appearance, and this I accomplish in providing a simply operated tool constructed to cut a multiple series of noodle strips of various conformations.

In carrying out the object of my invention, I employ a holding member or carrier made of spring wire, comprising the handle 5, the stems of which are continued at right angles and in opposite directions in the frame portions 6, from which extend at right angles, the arms 7, each terminating in an open spring ear 8. The handle 5 and the portions 6 and 7 all extend in a like plane, the ears being continued laterally outward as shown in Fig. 2.

Removably held within the spring ears 8, is the cutter shaft 10, having its ends in the form of trunnions, each being provided with a circumscribing groove 11. The ends of this shaft are rounded, as shown at 9, so that the shaft ends may be conveniently sprung into the ears 8, this shaft, it being understood, being removably held to the ears as shown.

In connection with my noodle cutter, I use two kinds of rotary cutters, as clearly shown in Fig. 1.

As shown in the drawings, the cutters or cutter disks 12 are in the form of knife-edged disks, each having a central opening so that the cutter may be readily held to the shaft 10. The cutters 13 have a diameter equal to that of the cutters 12, but each of these cutters 13 is provided with a series of radially extending corrugations, as shown. Held between these cutting disks are washers of suitable width and facial conformation, so that these washers will be in proper contact between the various circular cutters.

In Fig. 1 I have shown a number of disk and corrugated cutters, so arranged as to cut noodle strips of four different shapes or varieties. The noodles between the first three disk cutters 12 will be in the form of parallel edged strips, as shown at *a*. The first noodle strip cut between the first corrugated cutter 13 and the adjacent disk cutter will have one flat and one scalloped edge, while the next three noodle strips cut between the corrugated blades will somewhat resemble a series of connected disks, the blades being so set that the convolutions of the blades approach and recede from one another, as shown. The fourth series of noodle strips, as shown at *d*, are in the form of wavy, parallel edged strips. By this means the two kinds of cutters may be so adjusted, that in one movement of the cutter four different kinds of noodle strips may be cut, each kind being of a different conformation.

As shown, the washers 14 are in the form of disks, while the washers 15 have one disk and one corrugated face. The washers marked C are arranged to hold the corrugated cutters in such a position as to cut the bead or disk-appearing noodles. The washers 16 are again of a different conformation, so that the knives are so held as to cut the wavy noodles.

As the knives are removably held upon the shaft, they can be readily removed when it is desired to clean or sharpen the same. By my invention I produce an instrument which is easily operated and arranged to cut a multiple series of noodle strips of different conformations.

And having thus described my said invention, what I claim as new and desire to secure by United States Letters Patent is:

1. A cutter of the class described, comprising a carrier made of wire having two arms held in resilient parallel spaced relation each terminating in an open spring ear, a supporting shaft having a trunnion at each end, each trunnion having a circumscribing groove arranged to contain one of said spring ears, a plurality of loosely held disk cutters upon said shaft, washers between said disk cutters, a plurality of circular cutters having radially projecting corrugations held upon said shaft, and corrugated washers to lock each corrugated cutter to the next adjacent cutter, as and for the purpose set forth.

2. A cutter comprising a carrying member, having two arms held in resilient parallel spaced relation, each terminating in an open spring ear, a supporting shaft having a trunnion at each end, each trunnion having a circumscribed groove arranged to contain one of said spring ears, a plurality of disk cutters, and a plurality of corrugated cutters held upon said shaft, and suitable washers to hold said cutters, and as and for the purpose set forth.

In testimony whereof I affix my signature, in presence of two witnesses.

FRED. L. HAWKINS.

Witnesses:
 ENOCH HIGHSHEW,
 W. R. BUTLER.